(12) United States Patent
Miyazaki

(10) Patent No.: US 6,928,058 B2
(45) Date of Patent: Aug. 9, 2005

(54) IEEE-1394 STANDARDIZED APPARATUS AND CONFIGURATION METHOD THEREIN

(75) Inventor: Hiroyuki Miyazaki, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 841 days.

(21) Appl. No.: 09/778,775

(22) Filed: Feb. 8, 2001

(65) Prior Publication Data

US 2001/0024424 A1 Sep. 27, 2001

(30) Foreign Application Priority Data

Mar. 24, 2000 (JP) .......... 2000-084940
Dec. 21, 2000 (JP) .......... 2000-388574

(51) Int. Cl.$^7$ .......... H04L 12/28
(52) U.S. Cl. .......... 370/254; 370/257
(58) Field of Search .......... 370/241, 242, 370/244, 247, 250, 254, 257; 714/43; 710/107, 110, 104

(56) References Cited

U.S. PATENT DOCUMENTS

| 5,724,517 A | * | 3/1998 | Cook et al. | 709/227 |
|---|---|---|---|---|
| 5,764,930 A | * | 6/1998 | Staats | 710/107 |
| 6,233,611 B1 | * | 5/2001 | Ludtke et al. | 709/223 |
| 6,298,406 B1 | * | 10/2001 | Smyers | 710/305 |
| 6,427,198 B1 | * | 7/2002 | Berglund et al. | 711/170 |
| 6,519,634 B1 | * | 2/2003 | Song et al. | 709/220 |
| 6,636,526 B1 | * | 10/2003 | Nyu | 370/445 |
| 6,647,446 B1 | * | 11/2003 | James et al. | 710/100 |
| 6,654,353 B1 | * | 11/2003 | Tokura et al. | 370/354 |
| 6,658,474 B2 | * | 12/2003 | Kang | 709/227 |
| 6,732,301 B1 | * | 5/2004 | Landry et al. | 714/43 |

FOREIGN PATENT DOCUMENTS

JP    10-126426    5/1998

* cited by examiner

Primary Examiner—Ajit Patel
Assistant Examiner—Steven Blount
(74) Attorney, Agent, or Firm—Staas & Halsey LLP.

(57) ABSTRACT

In the non-node, the apparatus neither obtains a self physical_ID nor transmits a self_ID packet. Therefore, the apparatus is not recognized as a node in a self-identification phase. However, the apparatus transmits an indent_done signal received from a child node directly to a parent node. Moreover, when the apparatus becomes a route node in a tree identification phase in the non-node mode, after normal configuration, a PHY configuration packet output section outputs a PHY configuration packet for resetting an apparatus of another node as a route node. In a normal mode, the apparatus obtains a self phsycial_ID and transmits a self_ID packet. Therefore, the apparatus is recognized as a node in the self-identification phase.

8 Claims, 6 Drawing Sheets

FIG.2

| 00 | phy_ID | R | T | gap_count | 00 | 00 | 00 | 00 | 00 | 00 | 00 | 00 | 00 | 00 |
|---|---|---|---|---|---|---|---|---|---|---|---|---|---|---|
| | 12 | 11 | | | | | LOGICAL INVERSION OF FIRST Quadlet | | | | | | | |

FIG.4

| NAME OF TERMINALS | I/O | FUNCTION |
|---|---|---|
| TPA0+ | I/O | FIRST PORT TWISTED PAIR CABLE A POSITIVE PHASE INPUT/OUTPUT |
| TPA0− | I/O | FIRST PORT TWISTED PAIR CABLE A NEGATIVE PHASE INPUT/OUTPUT |
| TPB0+ | I/O | FIRST PORT TWISTED PAIR CABLE B POSITIVE PHASE INPUT/OUTPUT |
| TPB0− | I/O | FIRST PORT TWISTED PAIR CABLE B NEGATIVE PHASE INPUT/OUTPUT |
| TPA1+ | I/O | SECOND PORT TWISTED PAIR CABLE A POSITIVE PHASE INPUT/OUTPUT |
| TPA1− | I/O | SECOND PORT TWISTED PAIR CABLE A NEGATIVE PHASE INPUT/OUTPUT |
| TPB1+ | I/O | SECOND PORT TWISTED PAIR CABLE B POSITIVE PHASE INPUT/OUTPUT |
| TPB1− | I/O | SECOND PORT TWISTED PAIR CABLE B NEGATIVE PHASE INPUT/OUTPUT |
| XI | − | LIQUID CRYSTAL OSCILLATOR CONNECTION TERMINAL |
| XO | − | LIQUID CRYSTAL OSCILLATOR CONNECTION TERMINAL |
| TPBIAS0 | O | FIRST PORT-USE TWISTED PAIR BIAS OUTPUT |
| TPBIAS1 | O | SECOND PORT-USE TWISTED PAIR BIAS OUTPUT |
| D[7:0] | I/O | LINK INTERFACE DATA INPUT/OUTPUT |
| CTL[0:1] | I/O | LINK INTERFACE CONTROL INPUT/OUTPUT |
| LREQ | I | LINK REQUEST INPUT |
| LPS | I | LINK POWER STATUS INPUT |
| SCLK | O | LINK CONTROL-USE CLOCK OUTPUT |
| PC[0:2] | I | POWER CLASS SETTING (SEE IEEE Std 1394-1995, SECTION 4.3.4.1) |
| Non-node | I | NON-NODE/NORMAL MODE SETTING INPUT |
| CPS | I | CABLE POWER STATUS INPUT |
| RESET | I | RESET INPUT |

IEEE-1394 STANDARDIZED APPARATUS AND CONFIGURATION METHOD THEREIN

FIELD OF THE INVENTION

The present invention in general relates to an IEEE-1394 standardized apparatus and a configuration method.

BACKGROUND OF THE INVENTION

Generally, for purposes of image data or sound data transmission, isochronous transmission systems, which are suitable for receiving and reproducing synchronized image and sound data, can be used. As a serial bus standard characterized by isochronous transmission, the IEEE-1394 standard can be used.

At a developing stage of applications based on this standard, a bus analyzer is occasionally connected to an IEEE-1394 serial bus so that various operations on the IEEE-1394 serial bus are analyzed. Accordingly, in order to adapt topology of the application development environment to an actual application usage environment, it is important that development tools, such as a bus analyzer, do not operate as a node.

According to the IEEE-1394 standard, a PHY layer (physical layer) that does not operate as a node is not defined. For this reason, a PHY controller LSI having PHY function defined by the IEEE-1394 standard is generally mounted to the bus analyzer which satisfies the IEEE-1394 standard.

However, when the bus analyzer mounted with the PHY controller LSI is connected to the IEEE-1394 serial bus, it is recognized as a node when topology is structured. For this reason, a problem arises as the topology of the application development environment cannot be adapted to the actual application usage environment. Moreover, in case of an application in which the topology is restricted, a problem arises because a bus analyzer cannot be connected to the IEEE-1394 serial bus.

SUMMARY OF THE INVENTION

It is an object of this invention to provide an apparatus, which can be connected with an IEEE1394 serial bus without the apparatus being recognized as a node. Moreover, another object of the present invention is to provide a configuration method for connecting the apparatus with the IEEE-1394 serial bus without the apparatus being recognized as a node.

The apparatus of the present invention according to the IEEE-1394 standard has a normal configuration control section which controls the configuration so that the apparatus is recognized as a node, and a non-node configuration control section which controls configuration so that the apparatus is not recognized as a node. The normal configuration control section obtains a self physical_ID and transmits a self_ID packet in a self-identification phase. The non-node configuration control section neither obtains a self physical_ID nor transmits a self_ID packet in the self-identification phase, but transmits an ident_done signal received from a child node directly to a parent node.

In addition, the apparatus of this invention has a PHY configuration packet output section such that when the apparatus becomes a route node in a tree identification phase in a non-node mode the PHY configuration packet output section carries out normal configuration and outputs a PHY configuration packet for resetting an apparatus of another node as a route node.

The apparatus of this invention can be connected with the IEEE-1394 serial bus where the apparatus is not recognized as a node by other apparatuses connected with the IEEE-1394 serial bus.

In the configuration method of the present invention according to the IEEE-1394 standard, when a non-node mode that an apparatus is not recognized as a node is specified and the apparatus is not a route node, the apparatus neither obtains a physical_ID nor transmits a self_ID packet but transmits an ident_done signal received from a child node directly to a parent node.

Further, when the apparatus becomes a route node regardless of the non-node mode, the apparatus obtains a physical_ID and transmits a self_ID packet, and generates to output a PHY configuration packet for resetting an apparatus of another node as a route node. In a normal mode that the apparatus is recognized as a node, the apparatus obtains a self physical_ID and transmits a self_ID packet.

According to the method of this invention, the apparatus can be connected with the IEEE-1394 serial bus where the apparatus is not recognized as a node by another apparatuses connected with the IEEE-1394 serial bus.

BRIEF DESCRIPTION OF THE DRAWINGS

Additional objects and advantages of the invention will become apparent from the following description of the embodiments in conjunction with reference to the accompanying drawings of which:

FIG. 2 is a packet configuration diagram for explaining a configuration of a PHY configuration packet generated in the apparatus of the present invention;

FIG. 4 is a chart showing a list of input/output terminals of the PHY layer control LSI to which the apparatus of the present invention is applied;

DESCRIPTION OF THE PREFERRED EMBODIMENTS

Figure 1:
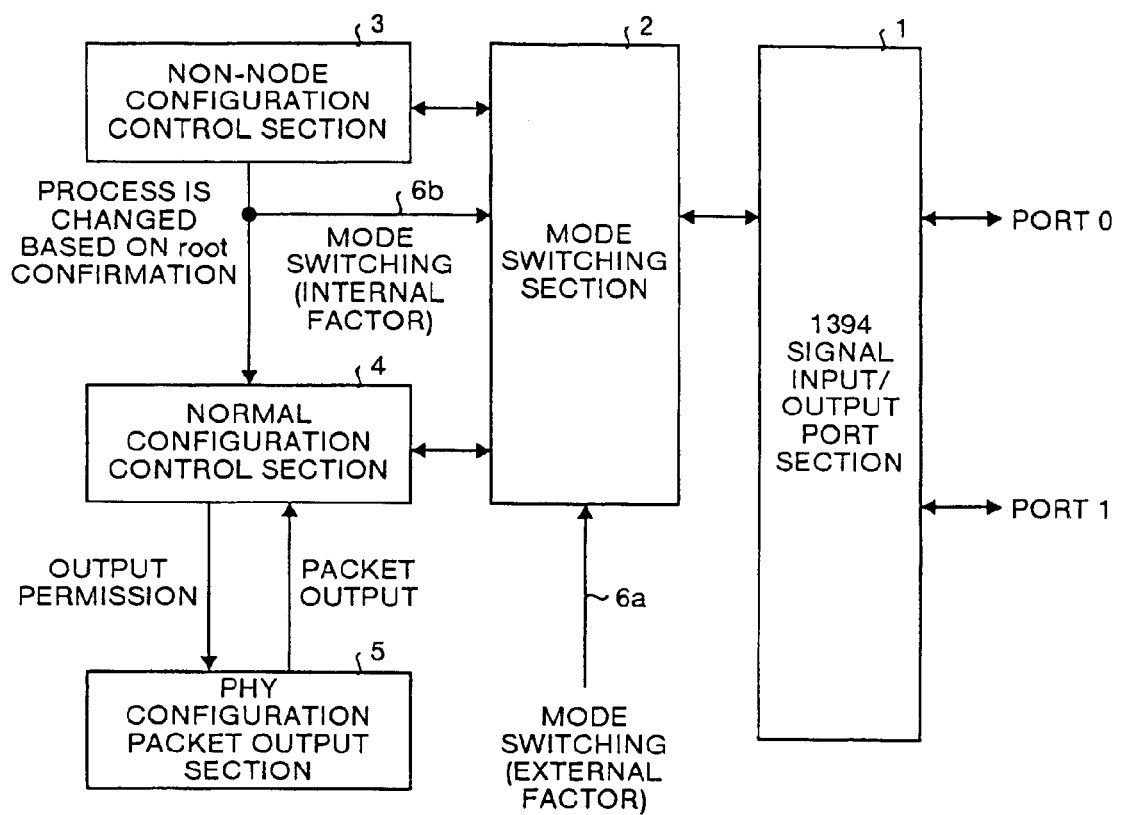
FIG. 1 is a functional block diagram showing an apparatus according to an embodiment of the present invention.

One preferred embodiment of the present invention will be explained below with reference to the attached drawings. The apparatus of the present invention will be explained first. The block diagram in FIG. 1 shows the functional configuration of the apparatus according to one embodiment of the present invention.

The apparatus according to an aspect of the present invention conforms to the IEEE-1394 standard and has a 1394 signal input/output port section 1, a mode switching section 2, a non-node configuration control section 3, a normal configuration control section 4 and a PHY configuration packet output section 5. The 1394 signal input/output port section 1 has at least two input/output ports, i.e., a port 0 and a port 1 in the shown example in FIG. 1. Another apparatuses to become a parent node and a child node are connected with these input/output ports respectively.

When the 1394 signal input/output port section 1 has three or more ports and this apparatus is used in a non-node mode, namely, the apparatus is not recognized as a node after the completion of configuration, only two input/output ports are valid in order to avoid topological discrepancy. According to an aspect of the present invention, other apparatuses having a high order node (parent node) or a low order node (child node) are connected with the valid two input/output ports. After the completion of the configuration, in the case of a mode that the apparatus is recognized as a node (hereinafter, the normal mode), a number of the valid input/output ports is not limited to two.

The mode switching section 2 switches input/output among the 1394 signal input/output port section 1, the non-node configuration control section 3 and the normal configuration control section 4 based on mode switching signals 6a and 6b supplied as mode switching unit. Namely, at the time of the non-node mode, the mode switching section 2 enables input/output of the non-node configuration control section 3 with respect to the 1394 signal input/output port section 1, and disables input/output of the normal configuration control section 4.

A process of self-identification phase is occasionally passed from the non-node configuration control section 3 to the normal configuration control section 4 due to internal factor. In this case, after the passing of the process, the input/output of the normal configuration control section 4 is enabled, and the input/output of the non-node configuration control section 3 is disabled. The internal factor will be mentioned later.

In addition, at the time of the normal mode or in the case where the process is passed from the non-node configuration control section 3, the mode switching section 2 disables the input/output of the non-node configuration control section 3 with respect to the 1394 signal input/output port section 1. The mode switching section 2 enables the input/output of the normal configuration control section 4 with respect to the 1394 signal input/output port section 1.

The non-node configuration control section 3 controls configuration so that the apparatus is not recognized as a node in the non-node mode. That is, the non-node configuration control section 3 neither obtains a self physical_ID nor transmits a self_ID packet in the self-identification phase, but transmits an ident_done signal received from a child node directly to a parent node. As a result, the apparatus is not recognized as a node by other apparatus connected with the IEEE-1394 serial bus.

However, when the apparatus becomes a route node in a tree identification phase, the non-node configuration control section 3 passes the process of the self-identification phase to the normal configuration control section 4. This is an example of the above-mentioned internal factor. At this time, the non-node configuration control section 3 transmits the mode switching signal 6b based on the internal factor to the mode switching section 2.

When taking over the process of the self-identification phase from the non-node configuration control section 3, the normal configuration control section 4 controls configuration so that the apparatus is recognized as a route node. That is, the normal configuration control section 4 obtains a self physical_ID and transmits a self_ID packet. Moreover, the normal configuration control section 4 transmits a signal which permits output of the PHY configuration packet to the PHY configuration packet output section 5.

In addition, the normal configuration control section 4 controls configuration so that the apparatus is recognized as a node in the normal mode similar to other apparatuses on the IEEE-1394 serial bus. More specifically, the normal configuration control section 4 obtains a self physical_ID and transmits a self_ID packet.

When receiving a PHY configuration packet output permission signal from the normal configuration control section 4, the PHY configuration packet output section 5 generates a PHY configuration packet and outputs the PHY configuration packet to the normal configuration control section 4. The PHY configuration packet is generated so as to reset another apparatus of a node other than the apparatus as a route node.

One example of the PHY configuration packet is shown In FIG. 2. In FIG. 2, when the third field 11 from the left, namely, a field on the right of a physical_ID (in the drawing, phy_ID) field 12 is set (in the drawing, "R"), the apparatus which receives this packet sets force root bit. Next, reconfiguration is carried out, thereby restructuring the topology.

During the reconfiguration, the apparatus which received the PHY configuration packet easily becomes a route node because output of parent_notify signal is delayed in the tree identification phase. Therefore, an apparatus other than the apparatus is set as a route node.

The mode switching signal 6a is generated upon selection by a user of the apparatus as to whether or not the apparatus Is recognized as a node. Namely, the mode switching signal 6a is generated based on an external factor. For example, the mode switching signal 6a is supplied from the outside via a not shown external terminal. The mode switching signal 6b is generated based on this internal factor.

Figure 3:
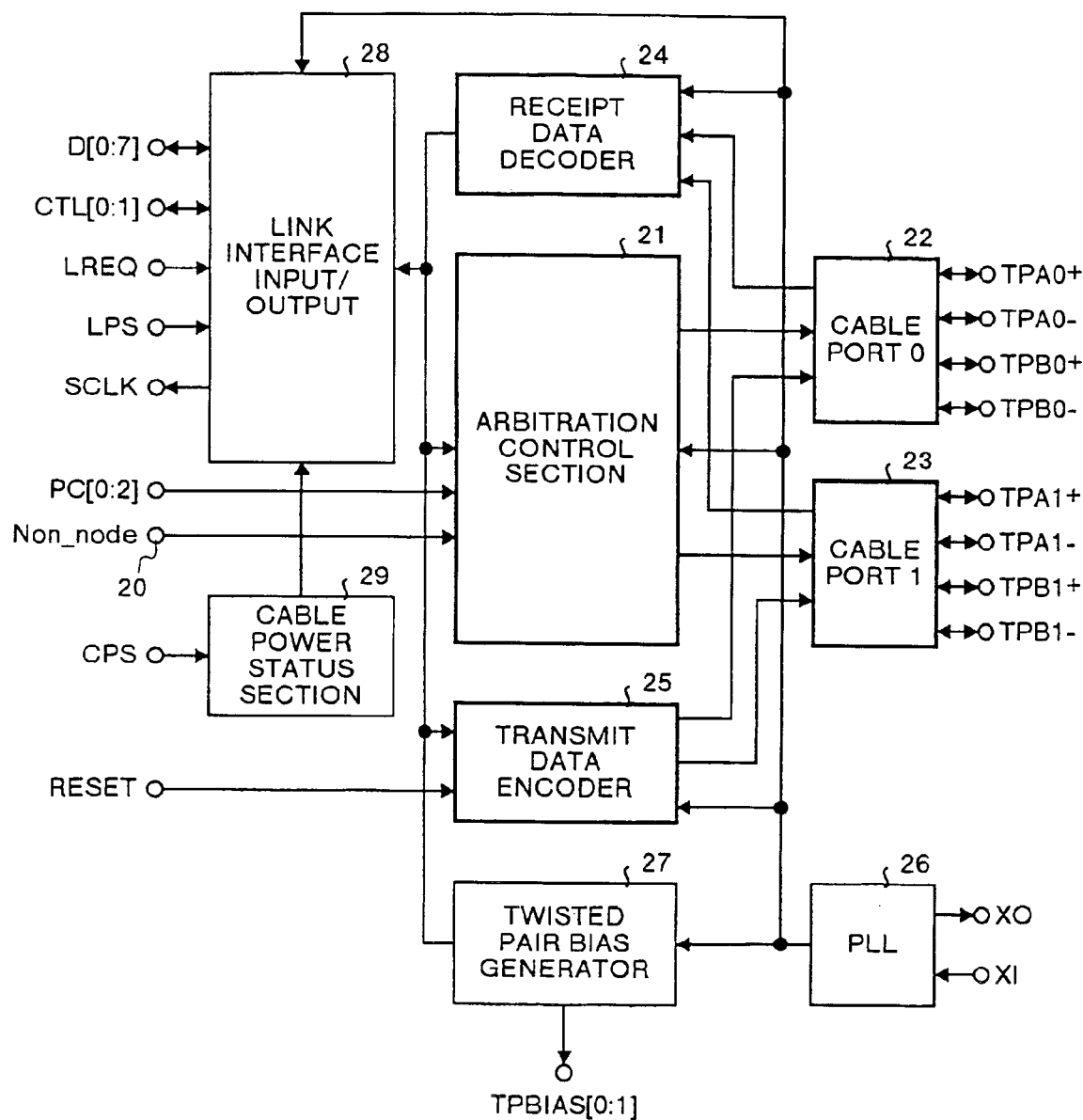
FIG. 3 is a block diagram showing one example of a PHY layer control LSI to which the apparatus of the present invention is applied.

The block diagram in FIG. 3 shows one example of the PHY layer control LSI to which the apparatus having the above structure is applied. This LSI has an arbitration control section 21, two cable ports 22 and 23, a receipt data decoder 24, a transmit data encoder 25, a phase lock loop (PLL) 26, a twisted pair bias generator 27, a link interface input/output 28 and a cable power status section 29. The arbitration control section 21, the cable ports 22 and 23, the receipt data decoder 24 and the transmit data encoder 25 correspond to the structure of the part shown in FIG. 1.

In the example shown in FIG. 3, a Non_node terminal 20 is provided as one of input terminals. The Non_node terminal 20 is connected with the arbitration control section 21. The mode switching signal 6a (see FIG. 1) which is generated based on external factor is supplied to the Non_node terminal 20. Since the other input/output terminals are the same as those in a conventional PHY layer control LSI, the list and description of the input/output terminals are shown in FIG. 4, and the explanation of the respective terminals is omitted.

Figure 5:
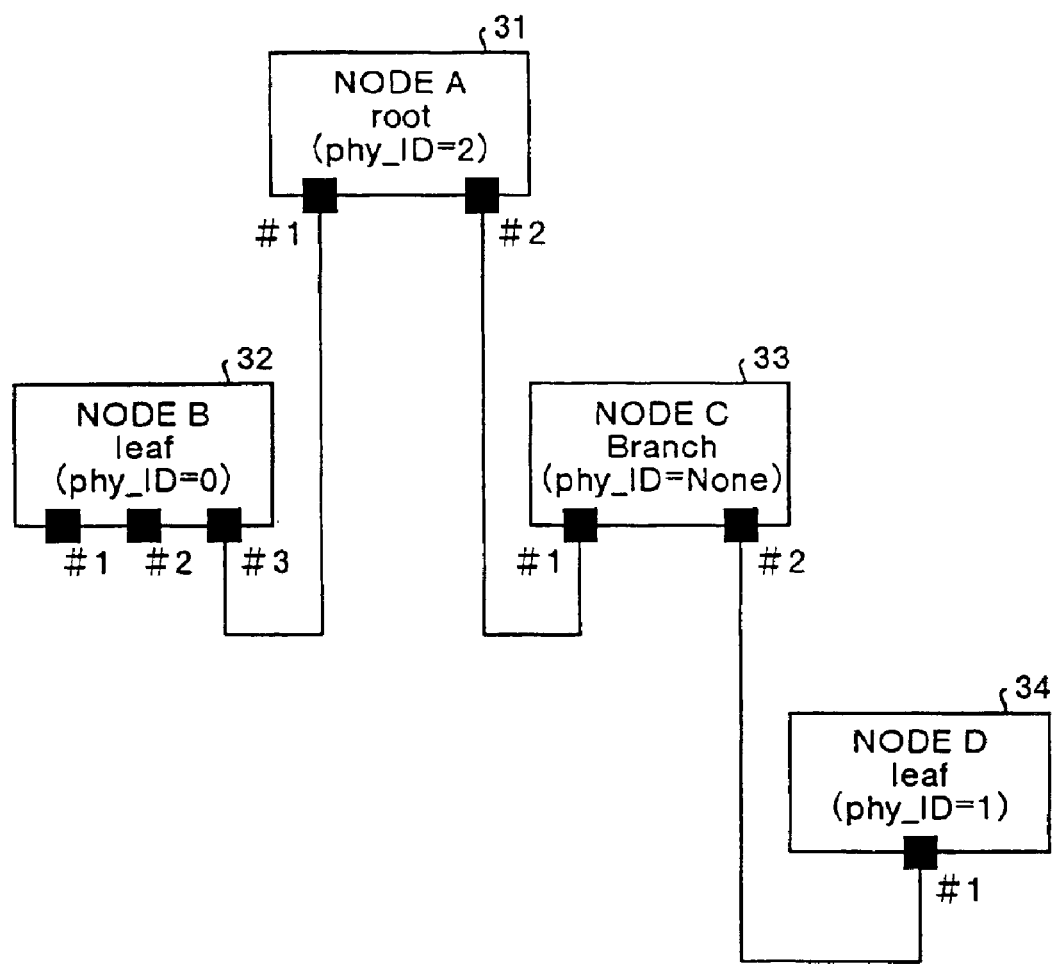
FIG. 5 is a schematic diagram showing one example of a tree including the apparatus of the present invention.

The schematic diagram in FIG. 5 shows one example of a tree configuration composed of four apparatuses including the apparatus having the above structure. In the example shown in FIG. 5, an apparatus 31 of a node A is a route node, and its physical_ID (in the drawing, phy_ID) is "2".

An apparatus 32 of a node B and an apparatus 33 of a node C are connected with a port 1 and a port 2 of the node A, respectively. The node B is a leaf node, and its physical_ID is "0". The node C is a branch node, but a physical_ID is not given to the node C. An apparatus 34 of a node D is connected with a child port of the node C, and it is a leaf node. A physical_ID of the node D is "1".

The apparatus 33 of the node C is the apparatus having the structure shown in FIG. 1, and is, for example, a bus analyzer. The apparatus of the node C is not recognized as a node by the other apparatuses (node A, node B and node C). Namely, in the tree structure shown in FIG. 5, two leaf nodes (B and D) are connected with the node A in appearance. The bus analyzer is used to be connected with IEEE-1394 serial bus to analyze various operations on the IEEE-1394 serial bus when applications are developed.

Figure 6:
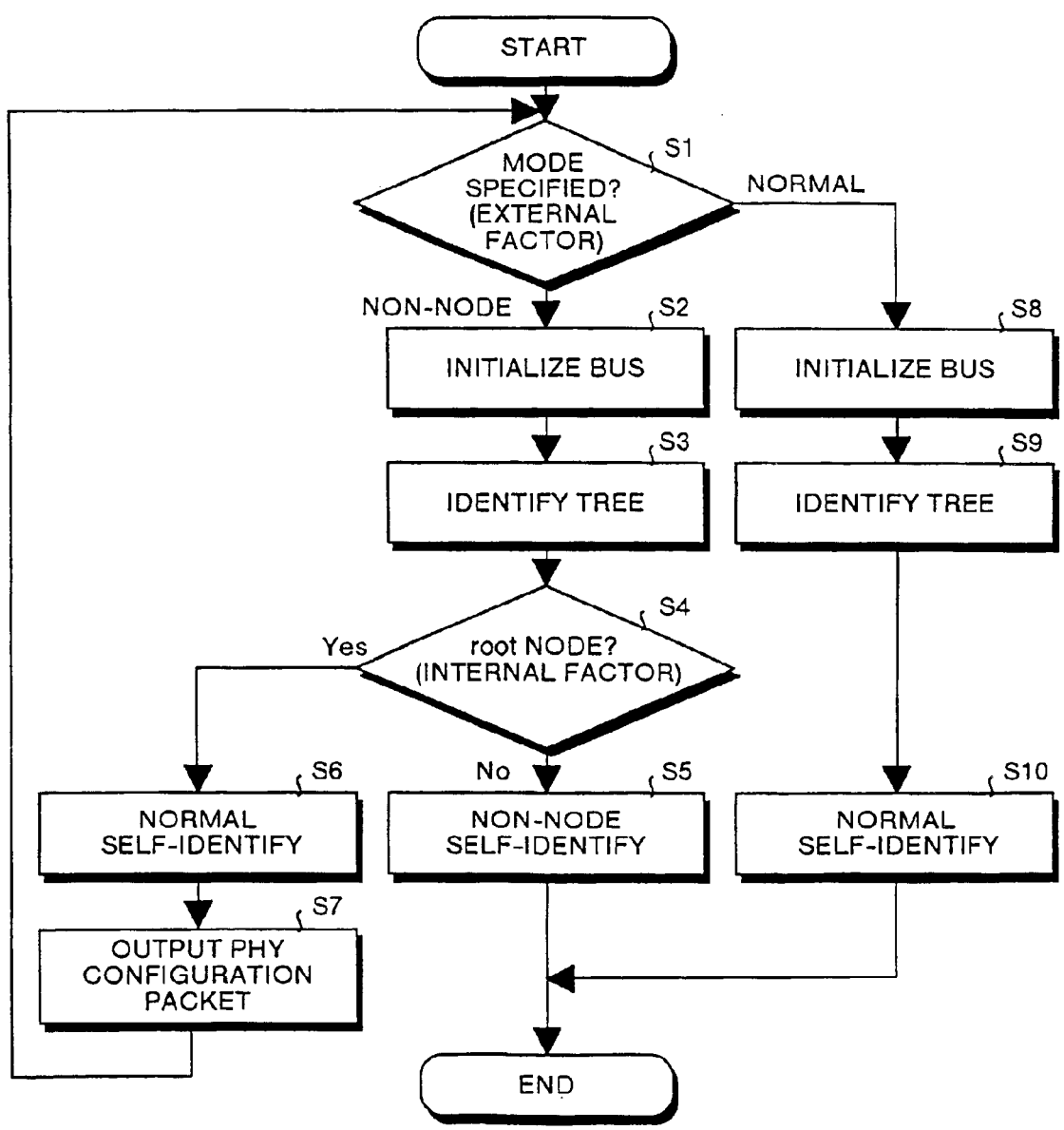
FIG. 6 is a flow chart showing a configuration method according to the embodiment of the present invention.

Next, a configuration method of the present invention will be explained below. FIG. 6 is a flow chart showing the configuration method according to the present invention. When configuration is started, an operation for judging a mode specified by user's setting (external factor) is executed (operation S1). When the result of the judgment is the non-node mode, the mode switching section 2 enables the input/output of the non-node configuration control section 3. As a result, the non-node configuration control section 3 is connected with the 1394 signal input/output port section 1.

Next, the IEEE-1394 serial bus is initialized (operation S2) and the tree is identified (operation S3). Thereafter, a judgment is made as to whether or not the apparatus Is the route node in the tree identification process (operation S4). When the apparatus is not the route node, a non-node self-identification process (operation S5) is executed, and the configuration is completed. Details of the non-node self-identification process will be mentioned later.

Meanwhile, when the apparatus is the route node, the internal factor of the mode switching is generated. For this reason, the self-identification phase process is passed to the normal configuration control section 4. Therefore, the mode switching section 2 enables the input/output of the normal configuration control section 4, and connects the normal configuration control section 4 with the 1394 signal input/output port section 1. The input/output of the non-node configuration control section 3 is disabled.

The normal configuration control section 4 executes a normal self-identification process (operation S6) so that the apparatus is recognized as a node. This normal self-identification process is the same as the conventional process. Thereafter, the normal configuration control section 4 permits the PHY configuration packet output section 5 to output the PHY configuration packet. The PHY configuration packet output section 5 outputs the PHY configuration packet (see FIG. 2) based on the output permission (operation S7). As a result, the above-mentioned configuration method is carried out repeatedly until the topology is structured without recognizing the apparatus as a node, and the topology is tried to be reconstructed.

When the normal mode is specified by the external factor, the mode switching section 2 enables the input/output of the normal configuration control section 4, and connects the normal configuration control section 4 with the 1394 signal input/output port section 1. Thereafter, the IEEE-1394 serial bus is initialized (operation S8), and a tree identification process (operation S9) and a normal self-identification process similar to the conventional process (operation S10) are executed successively, and the configuration is completed.

Here, the bus initializing process and the tree identification process at operations S8 and S9 are the same as the bus initializing process (operation S2) and the tree identification process (operation S3) in the non-node mode. Therefore, in the non-node configuration control section 3 and the normal configuration control section 4 shown in FIG. 1, one hardware can be commonly used for executing the bus initializing process and the tree identification process.

Next, details of the non-node self-identification process are explained below. For easy description, the explanation will refer to the tree structure shown in FIG. 5 as an example, but the present invention is not limited to this tree structure. The node A which becomes a route node in the tree identification process in the non-node mode (FIG. 6, operation S3) passes the control to a child node connected with the smallest-numbered port. In the example shown in FIG.5, the node A passes the control to the node B connected to the port 1.

The node B is not connected with a node other than the node A. Namely, a child node does not exist for the node B. Therefore, the node B obtains "0" as a self physical_ID, and transmits a self_ID packet. Thereafter, the node B transmits an ident_done signal to the node A as a parent node.

When receiving the ident done signal from the node B, the node A passes the control to a child node connected with a port with a number next smaller than that of the node A. In the example shown in FIG. 5, the node A passes the control to the node C connected with the port 2. The node C is also connected with the node D as well as the node A. Therefore, the node C passes the control to the node D.

A child node does not exist in the node D. Moreover, the node D receives one self_ID packet. Therefore, the node D obtains "1" as the self physical_ID, and transmits a self _ID packet. Thereafter, the node D transmits an ident_done signal to the node C as a parent node.

Since the non-node mode is specified in the node C, when receiving the ident_done signal from the node D, the node C transmits the ident_done signal directly to the node A. Namely, in the non-node mode, the node C neither obtains a self physical_ID nor transmits a self_ID packet. In the normal mode, the node C obtains a self physical_ID and transmits a self_ID packet, and transmits an ident_done signal to the parent node.

When the node A as a route node receives the ident_done signal, which is generated by the node D, from the node C, it means that the node A receives the ident_done signals via all the ports. A number of the ident_done signals received by the node A is two. Therefore, the node A obtains "2" as the self physical_ID, and transmits the self_ID packet. As a result, the non-node self-identification process is completed. Since the node C does not have a physical_ID, it is not recognized by the other nodes.

According to the above embodiment, the non-node configuration control section 3 and the normal configuration control section 4 are provided and output of both configurations can be selected. In the non-node mode, the non-node configuration control section 3 neither obtains a self physical_ID nor transmits a self_ID packet, but transmits the ident_done signal received from the child node directly to the parent node.

For this reason, the apparatus is not recognized as a node by the other nodes. Namely, the apparatus can be connected with the IEEE-1394 serial bus while the apparatus is not recognized as a node by the other apparatuses. Therefore, when this apparatus is used as a bus analyzer, the apparatus is effective in the quality of the application system development and in reducing TAT.

The present invention is not limited to the above-mentioned embodiment, and its design can be variously changed. For example, in the structure shown in FIG. 3, the mode switching signal 6a is supplied to the Non_node terminal 20. However, a register for storing a result that the non-node mode or the normal mode selected by a user is newly provided in the PHY layer control LSI, and the configuration may be carried out in one of the modes based on the value of the register.

According to the apparatus of the present invention, the apparatus has the normal configuration control section, which obtains the self physical_ID and transmits the self_ID packet so that the apparatus is recognized as a node, and the non-node configuration control section, which neither obtains the self physical_ID nor transmits the self_ID packet so that the apparatus is not recognized as a node, but transmits the ident_done signal received from the child node directly to the parent node. For this reason, the apparatus can be connected with the IEEE-1394 serial bus while the apparatus is not recognized as a node by the other apparatuses connected with the IEEE-1394 serial bus.

According to the configuration method of the present invention, the apparatus, which is not to be recognized as a node in the non-node mode, neither obtains the self physical_ID nor transmits the self_ID packet, and transmits the ident_node signal received from the child node directly to the parent node. Meanwhile, since the apparatus, which is recognized as a node in the normal mode, obtains the self physical_ID and transmits the self_ID packet, the apparatus can be connected with the IEEE-1394 serial bus while the apparatus is not recognized as a node by the other apparatuses connected to the IEEE-194 serial bus.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An apparatus for connection with a serial bus of IEEE-1394 standard, said apparatus comprising:
    a 1394 signal input/output port section having two or more input/output ports for connection with other apparatuses that function as parent and child nodes;
    a non-node configuration control section which controls a configuration of the apparatus in such a manner that said apparatus is not recognized as a node;
    a normal configuration control section which controls the configuration of the apparatus in such a manner that said apparatus is recognized as a node;
    a mode switching section which enables input/output of said non-node configuration control section or said normal configuration control section with respect to said 1394 signal input/output port section;
    a mode switching unit which controls switching of said mode switching section; and
    a PHY configuration packet output section which generates a PHY configuration packet for resetting an apparatus of another node as a route node so as to output the PHY configuration packet to said normal configuration control section.

2. The apparatus according to claim 1, wherein when one of the two input/output ports of said 1394 signal input/output port section is connected with another apparatus functioning as the parent node and the other port is connected with another apparatus functioning as the child node and said apparatus does not become a route node in a tree identification phase, said non-node configuration control section neither obtains a self physical_ID nor transmits a self ID packet in a self-identification phase but transmits an ident_done signal received from the child node directly to the parent node.

3. The apparatus according to claim 1, wherein when one of the two input/output ports of said 1394 signal input/output port section is connected with another apparatus functioning as the parent node and the other port is connected with another apparatus functioning as the child node and said apparatus becomes a route node in the tree identification phase, said non-node configuration control section passes an operation of a self-identification phase to said normal configuration control section.

4. The apparatus according to claim 3, wherein when said normal configuration control section takes over the operation of the self-identification phase from said non-node configuration control section, said normal configuration control section obtains a self physical_ID and transmits a self ID packet and permits said PHY configuration packet output section to output the PHY configuration packet.

5. The apparatus according to claim 1, wherein the apparatus connected with the serial bus of IEEE-1394 standard is a bus analyzer for analyzing operations on the serial bus of the IEEE-1394 standard.

6. A configuration method, comprising:
    specifying a non-node mode for controlling configuration of an apparatus so that the apparatus is not recognized as a node and specifying a normal mode for controlling configuration of the apparatus so that the apparatus is recognized as a node; and
    initializing a serial bus of an IEEE-1394 standard and recognizing a tree; and
    wherein when the non-node mode is specified, checking whether the apparatus is a route node; and when determining that the apparatus is not the route node, neither obtaining a self physical_ID nor transmitting a self_ID packet but transmitting an ident_done signal received from a child node directly to a parent node.

7. The configuration method according to claim 6, wherein when determining that the apparatus becomes a route node, the configuration method further comprises:
    obtaining a self physical_ID and transmitting a self_ID packet; and
    generating a PHY configuration packet for resetting an apparatus of another node as a route node so as to output the PHY configuration packet after a self-identification phase.

8. The configuration method according to claim 6, wherein when a normal mode is specified, the configuration method further comprises:
    initializing the serial bus of the IEEE-1394 standard; and
    obtaining a self physical_ID and transmitting a self_ID packet after the tree identification are carried out.

* * * * *

UNITED STATES PATENT AND TRADEMARK OFFICE
CERTIFICATE OF CORRECTION

PATENT NO. : 6,928,058 B2  Page 1 of 1
DATED : August 9, 2005
INVENTOR(S) : Hiroyuki Miyazaki It is certified that error appears in the above-identified patent and that said Letters Patent is hereby corrected as shown below:

<u>Title page,</u>
Item [56] References Cited, U.S. PATENT DOCUMENTS,
change "370/254" to -- 370/254 --.
Item [57], ABSTRACT,
Line 4, change "indent_done" to -- ident_done --.
Line 11, change "Phsycial_ID" to -- physical_ID --.

<u>Column 8,</u>
Lines 1 and 19, change "self ID" to -- self_ID --.

Signed and Sealed this

Fourth Day of April, 2006

JON W. DUDAS
*Director of the United States Patent and Trademark Office*